United States Patent [19]

Marchant

[11] Patent Number: 4,759,616
[45] Date of Patent: Jul. 26, 1988

[54] METHOD AND APPARATUS FOR ANAMORPHICALLY SHAPING AND DEFLECTING ELECTROMAGNETIC BEAMS

[75] Inventor: Alan B. Marchant, Kendall, N.Y.

[73] Assignee: Eastman Kodak Company, Rochester, N.Y.

[21] Appl. No.: 769,038

[22] Filed: Aug. 26, 1985

[51] Int. Cl.$^4$ .................. G02B 13/10; G02B 5/04
[52] U.S. Cl. .................................. 350/421; 350/286
[58] Field of Search ............................. 350/421, 286

[56] References Cited

U.S. PATENT DOCUMENTS

| | | | |
|---|---|---|---|
| 2,810,323 | 10/1957 | Coleman | 350/421 |
| 3,195,404 | 7/1965 | Bouwers | 350/421 |
| 3,891,308 | 6/1975 | Hawkins | 350/161 |
| 4,063,106 | 12/1977 | Ashkin et al. | 307/88.3 |
| 4,081,760 | 3/1978 | Berg | 331/94.5 |
| 4,410,237 | 10/1983 | Veldkamp | 350/320 |
| 4,580,879 | 4/1986 | Wilson | 350/421 |
| 4,623,225 | 11/1986 | Forkner | 350/421 |

*Primary Examiner*—John K. Corbin
*Assistant Examiner*—Scott J. Sugarman
*Attorney, Agent, or Firm*—Warren W. Kurz

[57] ABSTRACT

A right-angle optical prism is used to anamorphically shape and deflect by 90° a beam of electromagnetic radiation. Preferably, one of the prism's acute angles is cut at Brewster's angle, and the prism is oriented in the optical path of the beam such that the beam (a) intercepts, at the Brewster angle, that prism face opposite the prism's Brewster angle, (b) is internally reflected by that prism face opposite the prism's other acute angle, and (c) intercepts the prism's hypotenuse face at 90°.

7 Claims, 3 Drawing Sheets

METHOD AND APPARATUS FOR ANAMORPHICALLY SHAPING AND DEFLECTING ELECTROMAGNETIC BEAMS

BACKGROUND OF THE INVENTION

This invention relates to methods for anamorphically shaping and deflecting beams of electromagnetic radiation, for example, the light beam produced by a diode laser. More particularly, it relates to a method and apparatus for deflecting a beam by precisely 90° while anamorphically altering its intensity profile.

The advent of the diode laser has greatly expanded the need to handle laser beams of elliptical cross section. Because these lasers have very asymmetric active regions, they may exhibit beam divergence ratios in the 1:2–1:4 range. When the beam is collimated by a collector lens, it retains its ellipticity. The beam ellipticity, in turn, affects (usually reduces) the efficiency with which the beam can be focused through a circular objective lens.

Heretofore, it has been common to use a Littrow-type prism (i.e., a three-sided right angle prism) for anamorphically expanding an elliptical beam to make it more circular. The output of a diode laser is predominantly polarized in the TE state, and the collimated beam is polarized parallel to its minor axis. If, as shown in FIG. 1, the beam is incident at the Brewster angle $\theta_B$, on the hypotenuse face of a Littrow prism in which one of the acute angles is cut at the Brewster angle, it will be anamorphically expanded by a factor n in a direction of the minor axis, where n is the refractive index of the prism. While this is a good approach for reducing the ellipticity of a diode laser beam, it is disadvantageous from the standpoint that the beam is deflected by an inconvenient angle $\alpha$, where $\alpha = 2\theta_B - 90°$. For ordinary glass prisms, $\alpha$ is about 23°. For many applications, it is desirable that the expanded beam be either parallel to if not co-linear with, the incoming beam or, alternatively, be deflected during the expansion by some convenient angle, for example, 90°.

SUMMARY OF THE INVENTION

In view of the foregoing, an object of this invention is to provide a method and apparatus for anamorphically shaping (i.e., expanding or contracting) a beam of electromagnetic radiation while, at the same time, deflecting it precisely through an angle of 90°.

Like the prior art, the invention makes use of a Littrow-type prism, one having internal angles of 90°, $\theta_B$ and $(90° - \theta_B)$, where $\theta_B$ is approximately the Brewster angle. Unlike the prior art, however, such a prism is positioned in the optical path of the light beam such that the beam intercepts that prism face opposite the $\theta_B$ angle at (or near) the Brewster angle, is reflected by that prism face opposite the $(90° - \theta_B)$ angle, and intercepts the prism's hypotenuse face at (or about) 90°. By this arrangement of the prism relative to the beam path, the beam is anamorphically expanded or condensed, depending on the beam direction, and is deflected by precisely 90°.

The invention and its advantages will become more apparent to those skilled in the art from the ensuing detailed description of preferred embodiments, reference being made to the accompanying drawings.

DETAILED DESCRIPTION OF PREFERRED EMBODIMENTS

Figure 1:
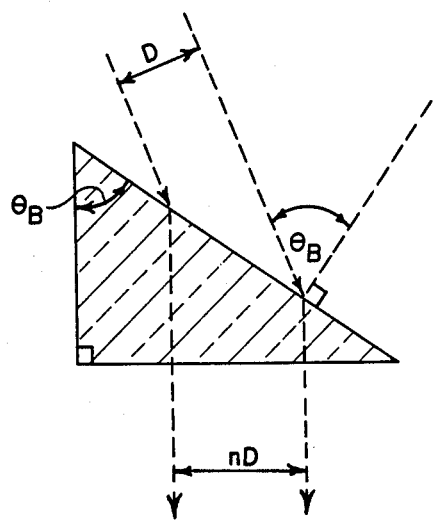
FIG. 1 illustrates an anamorphic beam expansion and deflection scheme as practiced by the prior art.
Figure 2:
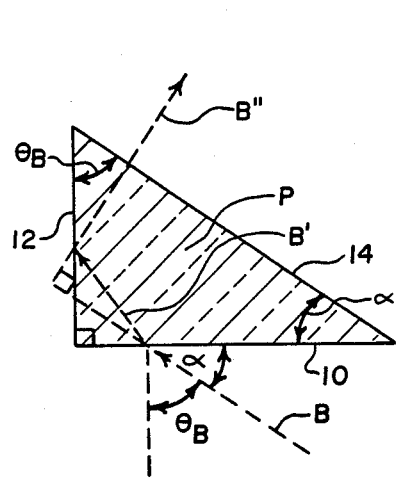
FIG. 2 illustrates the anamorphic beam expansion and deflection concept of the present invention.

Referring now to the drawings, FIG. 2 illustrates the basic inventive concept of the invention. As shown, a right-angle prism P (shown in cross-section) having acute angles $\theta_B$ and $\alpha$ is positioned in the optical path of a light beam B. Prism P is of conventional design, having a refractive index n and a value for angle $\theta_B$ defined by Brewster's Law, i.e., $\theta_B = \tan^{-1} n$. Glass prisms having a refractive index of approximately 1.5 give rise to a Brewster angle of approximately 57°. As noted above, prisms of this type have been used for anamorphic beam shaping and are disclosed in numerous references, for example, U.S. Pat. No. 4,410,237. To date, however, such prisms have been used in the manner described above with reference to FIG. 1.

According to the present invention, prism P is positioned in the optical path of beam B such that the beam is incident at the Brewster angle $\theta_B$ on prism's base 10, i.e., that prism face opposite the prism's Brewster angle. Assuming that beam B is plane polarized, as is the output of a diode laser, and the plane of polarization is parallel to the plane of incidence, beam B will be refracted at the prism/air interface with little or no light loss. The refracted beam B' is totally reflected from the short side 12 of the prism, i.e., that prism face opposite the smaller acute angle $\alpha$, to produce a reflected beam B" which emerges from the prism perpendicular to the prism's hypotenuse 14. Unexpectedly, beam B" has been found to be precisely perpendicular to the incident beam B. This 90° relationship between input and output beams is useful in the design of many optical systems.

Figure 3:
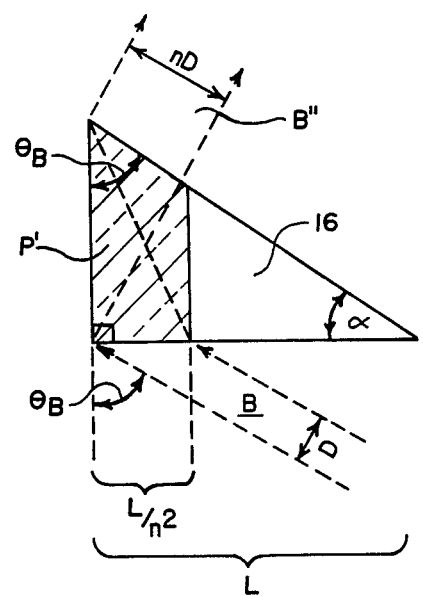
FIG. 3 shows a portion of prism useful in practicing the method of the invention.

Referring to FIG. 3, it will be appreciated that the entire prism shown in FIG. 2 is not used for the anamorphic expansion or contraction of the beam. If a smaller right-angle prism 16 is cut away, leaving a four-sided prism P', the remaining portion of prism P will perform the same anamorphic beam-shaping/deflection as before. Assuming the length of the prism base is L, prior to cutting, then the length of the remaining portion need be no longer than $L/n^2$, where n is the refractive index of the prism. While the beam is shown being expanded in one plane by a factor of n (the prism's index of refraction), it is clear that the beam can be anamorphically contracted by a factor $1/n$ by directing the beam in the opposite direction through the prism.

Figure 4:
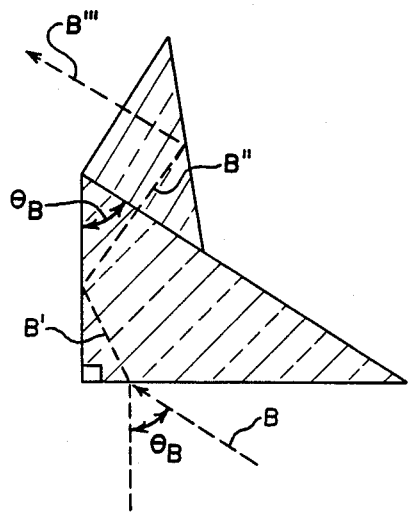
FIGS. 4–6 show various optical systems which incorporate the inventive concept for deflecting and combining beams of radiation.
Figure 5:
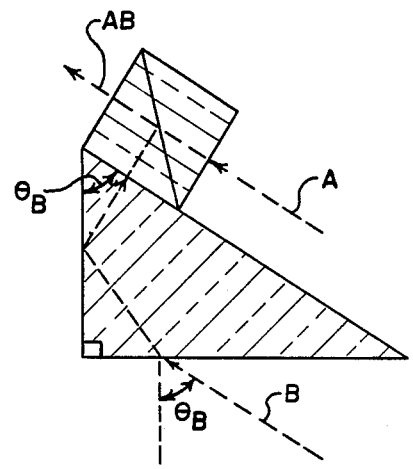
Figure 6:
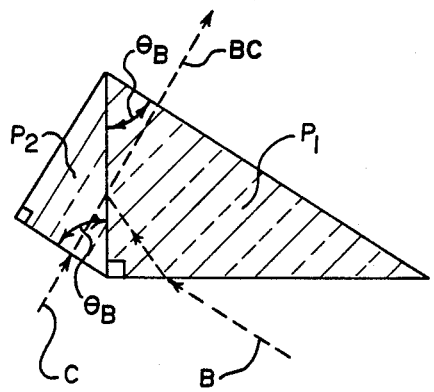

The right-angle prism described above can be combined with other prism's to perform more complicated manipulations very compactly. FIG. 4 illustrates how an isosceles, right-angle prism (with 45° acute angles) can be optically coupled (e.g., cemented) to the hypotenuse of prism P resulting in an anamorphic beam expansion with no directional deflection. That is, beam B''' is parallel to the incoming beam B. If a dichroic or polarization-beam-splitting-cube is optically coupled to the hypotenuse of prism P, as shown in FIG. 5, two parallel beams A and B can be combined while one of the beams, B is anamorphically expanded. FIG. 6 shows how two right-angle prisms can be joined to permit orthogonal beams B and C to be combined while one of such beams (beam B) is anamorphically expanded. In this case, the side of prism $P_1$ is cemented to the hypotenuse of prism $P_2$ with appropriate interference coatings therebetween. Of course, either of the beam-combining techniques disclosed in FIGS. 5 and 6 can also be used to separate a retro-reflected beam from the incident beam while simultaneously expanding the incident beam.

Figure 7:
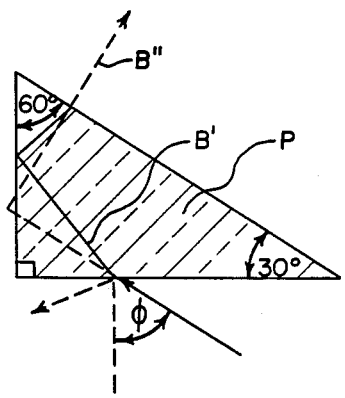
FIG. 7 illustrates a variation of the invention.

As indicated above, it is desirable that the angle opposite the prism base 10 be cut at the Brewster angle to minimize light loss. If the prism is a standard Littrow prism having angles of 30°, 60° and 90°, it is still possible, using the present invention, to achieve an anamorphic beam expansion and 90° deflection. In using such a prism, as shown in FIG. 7, the angle of incidence $\theta$ must equal about 55° in order to achieve a 90° deflection (for n=1.5). In this case, a small fraction of the beam will be reflected by the prism base resulting in an optical loss. The amount of expansion (or condensing) of the beam is nearly identical, however, to the prism shown in FIG. 2.

From the foregoing, it is apparent that the advantageous technical effect of the invention is to deflect a beam by precisely 90° while simultaneously shaping it to more closely approximate a desired profile. Obviously, two or more prisms may be arranged in tandem to multiply the expansion factor (n) and thereby even more closely approximate a desired profile.

Figure 8:
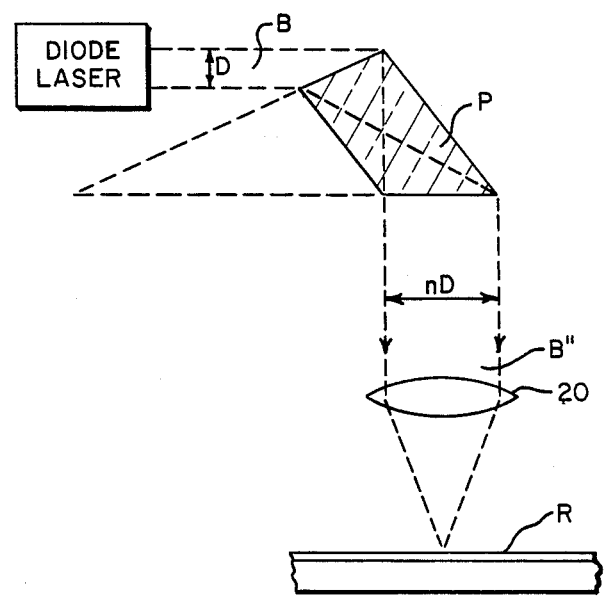
FIG. 8 illustrates recording apparatus embodying the invention.

In FIG. 8, the invention is shown embodied in an apparatus for recording information on a light-sensitive recording element R, e.g. an optical disc. As shown, a Littrow-type prism (or fraction thereof) is used to deflect the output beam B of a diode laser by precisely 90° before being focused by lens 20 onto the recording element. The intensity of beam B is modulated with information to be recorded in a conventional manner. Assuming the beam B has an elliptical cross section having major and minor axes, the beam can be anamorphically expanded to render it more circular in cross section by orienting the prism such that the beam's minor axis lies in the plane of incidence, i.e. that plane in which lie the incident beam and the refracted beam.

The invention and its various advantages will become more apparent to those skilled in the art from the ensuing detailed description of preferred embodiments, reference being made to the accompanying drawings.

I claim:

1. In a method for anamorphically shaping and deflecting a beam of electromagnetic radiation, said method comprising the step of positioning a prism in the optical path of such beam, said prism having internal angles of about 90°, $\theta_B$ and (90°$-\theta_B$), where $\theta_B$ is Brewster's angle, the improvement comprising the step of orienting said prism in the beam's optical path such that the beam (a) intercepts that prism face opposite the $\theta_B$ angle at approximately the Brewster angle, (b) reflects from that prism face opposite the 90°$-\theta_B$ angle, and (c) perpendicularly intercepts that prism face opposite the 90° angle, whereby the beam entering the prism is angularly displaced from the beam exiting the prism by 90°.

2. The method as defined by claim 1 further comprising the step of positioning an isosceles right angle prism in the optical path of the beam, said isosceles prism having two 45° acute angles and a reflective surface opposite the right angle thereof, said second prism being oriented such that the beam passes through both faces of the prism opposite the 45° angles and reflects from the reflective surface, whereby the beam, as finally deflected by said prisms, is parallel to the beam initially incident thereon.

3. A method for anamorphically expanding a beam of radiation and for deflecting such beam by 90°, said method comprising the step of passing such beam through a three-sided, right-angle prism of the type in which one of the two acute angles thereof is approximately the Brewster angle, and the other acute angle is the complement of the Brewster angle, and orienting such prism relative to the beam such that the beam is (a) incident at the Brewster angle on that prism face opposite said one of the acute angle, and (b) totally internally reflected by that prism face opposite said other acute angle, whereby the beam emerges from the prism through that face which is opposite the prism's right angle, and in a direction perpendicular to the beam incident on said prism.

4. A method for anamorphically contracting a beam of radiation and for deflecting such beam by 90°, said method comprising the step of passing such beam through a right-angle prism of the type in which one of the two acute angles thereof is approximately the Brewster angle, and the other acute angle is the complement of the Brewster angle, and orienting such prism relative to the beam such that the beam is (a) incident normal to that prism surface opposite the right angle and (b) totally internally reflected by that prism face opposite said other acute angle, whereby the beam emerges from the prism through that face which is opposite said one, acute angle in a direction perpendicular to the beam as incident on said prism.

5. Apparatus for anamorphically shaping and deflecting a beam of radiation said apparatus comprising a four-sided prism of refractive index n, said prism having (a) interior angles of 90°, 90°, $\theta_B$, and 180°$-\theta_B$, where $\theta_B$ is the Brewster angle; (b) two opposing sides which converge at an angle 90°$-\theta_B$ along a line of convergence, and (c) two parallel sides which are spaced apart by a distance $L/n^2$, where L is the shortest distance between said line of convergence and the farthermost of said parallel sides.

6. In an optical system, for anamorphically shaping and deflecting a beam of electromagnetic radiation, said system including: (i) a prism having internal angles of about 90°, $\theta_B$ and (90°$-\theta_B$), where $\theta_B$ is Brewster's angle, (ii) means for directing an input beam into said prism and (iii) means for receiving and directing an output beam from said prism for utilization, the improvement wherein said prism is oriented in the beam's optical path such that the beam (a) intercepts that prism face opposite the $\theta_B$ angle at approximately the Brewster angle, (b) reflects from that prism face opposite the 90°$-\theta_B$ angle, and (c) intercepts that prism face opposite the 90° angle, whereby the beam entering the prism is angularly displaced from the beam exiting the prism by 90°.

7. The apparatus as defined by claim 6 further comprising an isosceles right angle prism in the optical path of the beam, said isosceles prism having two 45° acute angles and a reflective surface opposite the right angle thereof, said isosceles prism being oriented such that the beam passes through both faces of the prism opposite the 45° angles and reflects from the reflective surface, whereby the beam, as finally deflected by said prisms, is parallel to the beam initially incident thereon.

* * * * *